United States Patent
Miyairi et al.

(10) Patent No.: US 11,015,876 B2
(45) Date of Patent: May 25, 2021

(54) POROUS HONEYCOMB HEAT STORAGE STRUCTURE

(71) Applicant: NGK Insulators, Ltd., Nagoya (JP)

(72) Inventors: Yukio Miyairi, Nagoya (JP); Shinichi Miwa, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 0 days.

(21) Appl. No.: 16/518,123

(22) Filed: Jul. 22, 2019

(65) Prior Publication Data
US 2019/0339024 A1   Nov. 7, 2019

Related U.S. Application Data

(63) Continuation of application No. PCT/JP2018/003443, filed on Feb. 1, 2018.

(30) Foreign Application Priority Data

Mar. 8, 2017   (JP) .............................. JP2017-044408

(51) Int. Cl.
*F28D 17/00* (2006.01)
*F28D 20/00* (2006.01)
(Continued)

(52) U.S. Cl.
CPC ........ *F28D 20/003* (2013.01); *C04B 38/0006* (2013.01); *C09K 5/16* (2013.01); *F01N 2240/10* (2013.01)

(58) Field of Classification Search
CPC ......... C04B 2235/3208; F01N 2240/10; F28D 19/00; F28D 17/00; F28D 17/02; F28D 20/003; F28D 20/00; F28D 20/02; F28D 20/023; F28D 2020/0004; F28D 2020/0008; F28D 2020/0013; F28D 2020/0017;
(Continued)

(56) References Cited

U.S. PATENT DOCUMENTS

| | | | | |
|---|---|---|---|---|
| 4,993,481 A | * | 2/1991 | Kamimoto | ............ F28D 20/023 165/10 |
| 2015/0367334 A1 | * | 12/2015 | Sadaoka | ............ B01J 37/0009 502/71 |

FOREIGN PATENT DOCUMENTS

| JP | H02-097895 A1 | 4/1990 |
|---|---|---|
| JP | 2011-027311 A1 | 2/2011 |

(Continued)

OTHER PUBLICATIONS

International Search Report and Written Opinion (Application No. PCT/JP2018/003443) dated Apr. 10, 2018.

*Primary Examiner* — Henry T Crenshaw
*Assistant Examiner* — Kamran Tavakoldavani
(74) *Attorney, Agent, or Firm* — Burr & Brown, PLLC

(57) ABSTRACT

A porous honeycomb heat storage structure including:

a honeycomb structure which has a porous partition wall which defines a plurality of cells extending one end face to the other end face and allows a reaction medium to flow into the cells; and a heat storage portion which is configured by filling a heat storage material performing heat storage and heat dissipation by a reversible chemical reaction with the reaction medium or physical adsorption/desorption in at least a portion of each cells, wherein the heat storage portion has an area ratio in a range from 60% to 90% with respect to a cross sectional area of a honeycomb cross section orthogonal to an axial direction of the honeycomb structure.

7 Claims, 7 Drawing Sheets

(51) Int. Cl.
     *C04B 38/00*     (2006.01)
     *C09K 5/16*      (2006.01)

(58) Field of Classification Search
     CPC ..... F28D 2020/0026; F28D 2020/0034; F28D 2020/0047; F28D 2020/0056; F28D 2020/006; F28D 2020/0065; F28D 2020/0069; F28D 2020/0078; F28D 2020/0086; F28F 21/04; F28F 7/02; C09K 5/16
     USPC .................................................. 165/9.1, 10
     See application file for complete search history.

(56) References Cited

FOREIGN PATENT DOCUMENTS

| | | | |
|---|---|---|---|
| JP | 2013-112706 | A1 | 6/2013 |
| JP | 2013-124823 | A1 | 6/2013 |
| JP | 2013124823 | A * | 6/2013 |
| JP | 2015-040646 | A1 | 3/2015 |

\* cited by examiner

< HEAT STORAGE >

< HEAT DISSIPATION >

POROUS HONEYCOMB HEAT STORAGE STRUCTURE

BACKGROUND OF THE INVENTION

1. Field of Invention

The present invention relates to a porous honeycomb heat storage structure, and more specifically, a porous honeycomb heat storage structure using a heat storage material capable of performing improved heat storage and heat dissipation with high responsiveness by a chemical reaction with a reaction medium or physical adsorption/desorption.

2. Description of Related Art

In the related art, various technologies are suggested, which relate to a heat storage structure (heat storage member, heat storage system, or the like) which uses a heat storage material to recover and store exhaust heat of an automobile or the like and uses the stored heat to activate a catalyst (exhaust gas treatment catalyst) at the next engine start (for example, refer to Patent Documents 1 to 3). According to the technologies, the heat which is recovered and stored by the heat storage structure is dissipated at an appropriate timing, and thus, a temperature of the catalyst can rapidly increase to a catalyst activation temperature, and it is possible to shorten a time until high catalyst activity is exhibited.

Accordingly, the catalyst can exhibit high catalyst activity immediately after the engine start, and it is possible to increase exhaust gas purification efficiency. In a heat storage device disclosed in Patent Document 1, a "chemical heat storage material" is used as a heat storage material, which can perform "heat storage" to recover and store heat and "heat dissipation" to release or discharge the heat by a reversible chemical reaction with a reaction medium (liquid such as water). In addition, a heat storage material capable of performing the heat storage and the heat dissipation not by the chemical reaction but by physical adsorption and desorption is also used.

Meanwhile, in recent years, many efforts or activities for protecting a natural environment are actively performed. For example, in order to prevent global warming, it is required to reduce the emission of carbon dioxide in industrial activities in each country.

In order to achieve the above-mentioned purpose, it is attempted to more effectively use energy obtained by combusting fossil fuels such as coal and oil to reduce consumption of fossil fuels and directly reduce the emissions of the carbon dioxide. Among such efforts, promotion of the effective use of the heat storage material, which can effectively store heat energy and can use the stored heat energy as needed, is examined particularly in an automotive field or the like.

Here, the chemical heat storage material refers to a substance or material capable of performing heat absorption (heat storage) and heat discharge (heat dissipation, heat generation) by a chemical reaction. The chemical heat storage material effectively recovers heat, can store the heat over a long period of time, and can release the heat as needed. In addition, the chemical heat storage material can perform a heat storage process and a heat dissipation process in a reversible manner. Therefore, the chemical heat storage material can be repeatedly subjected to the heat storage and the heat dissipation, and can be used particularly effectively in the above-mentioned automotive field.

For example, as a specific example of the chemical heat storage material, an alkaline earth metal oxide or the like (for example, calcium oxide (CaO) or the like) is mainly used as a main component constituting the chemical heat storage material. In addition, a liquid such as water ($H_2O$) is used as the reaction medium, the calcium oxide and the water come into contact with each other, and thus, a chemical reaction is generated. In this case, the calcium oxide and the water come into contact with each other, and thus, a hydroxide compound (calcium hydroxide ($Ca(OH)_2$) is generated. At this time, heat (heat of formation) is generated simultaneously with the formation of the hydroxide compound (product). It is possible to increase a temperature of a material such as the catalyst using the generated heat.

Meanwhile, when heat is externally applied to the hydroxide compound, the calcium oxide (CaO) and the water ($H_2O$) are generated, and thus, an endothermic reaction is generated. In this case, a temperature of the generated water is high, and thus, a phase transition is generated from the water to gas (steam). According to this principle, the chemical heat storage material can repeatedly perform the process and the heat dissipation process.

Meanwhile, the present applicant has studied a heat storage structure having a novel structure using the above-mentioned chemical heat storage material, and has already proposed the heat storage structure (refer to Patent Document 4). In Patent Document 4, a heat storage structure is suggested, in which a ceramic honeycomb structure having partition walls in which a plurality of cells serving as a flow path of a fluid are defined and formed is used, the cells of the honeycomb structure are filled with heat storage materials such that the heat storage materials are alternatively arranged one by one, both ends of the cell filled with the heat storage material are plugged, and the heat storage material is enclosed in a portion of the cell.

CITATION LIST

Patent Documents

Patent Document [1] JP-A-2011-27311
Patent Document [2] JP-A-2013-112706
Patent Document [3] JP-A-2015-40646
Patent Document [4] JP-A-2013-124823

SUMMARY OF THE INVENTION

Problem to be Solved by the Invention

As general characteristics of the above-mentioned heat storage material (mainly, chemical heat storage material), it is known that a responsiveness (or heat storage/dissipation speed) of the heat storage and the heat dissipation is low. That is, in order for the heat storage material to start the heat storage process and the heat dissipation process, it is necessary to rapidly transmit heat to be applied externally to the heat storage material or it is necessary to cause the heat storage material and the reaction medium (water or the like) to come into rapid contact with each other. However, since a thermal conductivity (or heat conductivity) of the heat storage material itself is low or diffusion (or permeability or the like) of the reaction medium with respect to the heat storage material is slow, it is the main factor that the above-mentioned responsiveness is not good.

In addition, if the heat storage process and the heat dissipation process are repeatedly performed, an area (reaction area) where the heat storage material and the reaction medium come into contact with each other may be reduced due to factors such as the heat storage material being aggregated. Accordingly, a good heat storage process or the like is not performed due to the reduction of the reaction area, and thus, there is a concern that heat storage performance or heat dissipation performance may decrease. That is, in the heat storage structure of the related art, "repeat durability" which can withstand the repeated use is poor, which may cause practical problems.

Here, in the case of the heat storage structure described in Patent Document 4, the honeycomb structure having the plurality of cells is used so as to improve the responsiveness, and thus, it is possible to achieve a certain effect of improving diffusion or the like between the reaction medium and the heat storage medium to a certain extent. However, contactability (diffusion) between the reaction medium and the heat storage material is still not good, which may cause problems in the responsiveness.

Therefore, it takes time until a sufficient amount of reaction medium necessary for the heat dissipation is diffused throughout all the heat storage materials, or it takes time until the externally applied heat is transmitted to the heat storage material. In addition, there is a variation in a diffusion velocity when the reaction medium is diffused to the heat storage material, a heat generation reaction is locally generated in the heat storage material, and only a portion of the heat storage material reaches a high temperature. In this case, the heat may be saturated only at the portion where the heat generation reaction is generated, and the heat may not be transmitted efficiently to a periphery of the portion.

In addition, in a case of the heat storage structure in the related art, the thermal conductivity of the heat storage material itself used may be low. Accordingly, the generated heat is not rapidly transmitted to the outside and is not effectively used to increase the temperature of the catalyst or the like, and in the process of the transmission, there are cases where heat loss frequently occurs, which loses heat energy. Similarly, in a process of recovering and storing the externally applied heat energy in the heat storage process, there is a possibility that the heat energy may be lost.

As a result, in the entire heat storage structure, a heat generation rate decreases, heat generation efficiency or heat storage efficiency decreases, and thus, the heat energy generated by fossil fuels or the like cannot be effectively utilized without causing heat loss. In addition, the reduction of the reaction area due to the aggregation of the above-described heat storage material may reduce the heat storage effect and the heat dissipation effect, and may lack the durability for a repeated use.

Meanwhile, in the case of the heat storage structure described in Patent Document 4, although it is possible to achieve a certain effect, an amount of heat storage material used per unit volume of the heat storage structure is reduced, and thus, there is a possibility that a heat generation amount and a heat storage amount per unit volume is inevitably suppressed.

In addition, in the heat storage structure described in Patent Document 4, in order to hold the heat storage material filling the inside of the cell, a pair of plugging portions of plugging one end face side and the other end face side of the cell serving as the flow path of the fluid by a known plugging material is provided. As the plugging portion, a material having a relatively low porosity is used, and contact between the reaction medium and the heat storage material may be considerably limited by the configuration of the plugging portion.

Accordingly, the present invention is made in consideration of the above-described circumstances, and a main object thereof is to provide a highly responsive porous honeycomb heat storage structure which has an improved diffusion between the porous honeycomb heat storage structure and the reaction medium such as water, can suppress a local occurrence of heat, and can rapidly perform the heat storage and the heat dissipation.

In addition, another object of the present invention is to provide a porous honeycomb heat storage structure having durability capable of being repeatedly used without decreasing heat storage performance or heat dissipation performance even in a case where a plurality of heat storage processes and heat dissipation processes are repeated in a reversible manner.

Means for Solving the Problem

According to the present invention, a porous honeycomb heat storage structure of achieving the object is provided.

According to a first aspect of the present invention, a porous honeycomb heat storage structure is provided including: a honeycomb structure which has a porous partition wall which defines a plurality of cells extending one end face to the other end face and allows a reaction medium to flow into the cells; and a heat storage portion which is configured by filling a heat storage material performing a heat storage and a heat dissipation by a reversible chemical reaction with the reaction medium or physical adsorption/desorption in at least a portion of each cells, in which the heat storage portion has an area ratio in a range from 60% to 90% with respect to a cross sectional area of a honeycomb cross section orthogonal to an axial direction of the honeycomb structure.

According to a second aspect of the present invention, the porous honeycomb heat storage structure according to the above first aspect is provided, further comprising: a plugging portion which plugs the one end face and the other end face of the cells by a plugging material so as to enclose the heat storage material in the cells, in which the plugging portion has a porosity of 48% or more.

According to a third aspect of the present invention, the porous honeycomb heat storage structure according to the first or second aspects is provided, in which the cells are configured to include at least two types of first cells and second cells having a cell shape different from that of the first cells, the first cells and the second cells are arranged according to a predetermined arrangement standard, and the heat storage portion is formed in at least one of the first cells and the second cells.

According to a fourth aspect of the present invention, the porous honeycomb heat storage structure according to the above third aspect is provided, in which a first cells total open frontal area indicating a ratio of a total opening area of all the first cells in the honeycomb cross section with respect to the honeycomb cross section is set to be larger than a second cells total open frontal area indicating a ratio of total opening areas of all the second cells in the honeycomb cross section with respect to the honeycomb cross section, in the first cells, the heat storage portion is formed in all the first cells, and in the second cells, the heat storage portion is formed in all the second cells or at least a portion of the second cells.

According to a fifth aspect of the present invention, the porous honeycomb heat storage structure according to the third or fourth aspects is provided, in which the cells are formed by any one of combinations among a combination in which the first cells are pentagonal and the second cells are rectangular, a combination in which the first cells are octagonal and the second cells are rectangular, a combination in which the first cells are hexagonal and the second cells are rectangular, and a combination in which the first cells are hexagonal and the second cells are triangular.

According to a sixth aspect of the present invention, the porous honeycomb heat storage structure according to any one of the above first to sixth aspects is provided, in which the partition wall of the honeycomb structure has a thermal conductivity of 10 W/mK or more.

According to a seventh aspect of the present invention, the porous honeycomb heat storage structure according to any one of the above first to sixth aspects is provided, in which the partition wall of the honeycomb structure has a porosity of in a range of 35% to 80%.

According to a eight aspect of the present invention, the porous honeycomb heat storage structure according to any one of the first to seventh aspects is provided, in which the heat storage material includes at least any one of an alkaline earth metal oxide and an alkaline earth metal chloride as a main component.

According to a ninth aspect of the present invention, the porous honeycomb heat storage structure according to any one of the above first to eighth aspects is provided, in which the honeycomb structure is configured to include a Si/SiC based ceramic material as a main component.

Effect of the Invention

According to the porous honeycomb heat storage structure of the present invention, the heat storage portions in which the plurality of cells of the honeycomb structure having the porous partition walls are filled with the heat storage materials are provided, and thus, the reaction medium can flow into the insides of the cells and the porous partition walls. Therefore, contact between the heat storage portions (heat storage materials) and the reaction medium is rapidly performed, and an excellent responsiveness for the heat storage and the heat dissipation is obtained. In addition, the porosity of the plugging portion which encloses the heat storage portion in the cell is set to be high, and thus, the reaction medium can pass through the plugging portion so as to come into contact with the heat storage portion, and more excellent responsiveness can be obtained.

In addition, the heat storage portion is formed in each of the plurality of cells, and thus, even when the heat storage and the heat dissipation are repeated, the heat storage portions are prevented from being aggregated into a large block. As a result, repeat durability is improved, and even when the heat storage process and the heat dissipation process are repeated in a reversible manner, the diffusion of the reaction medium is not damaged, and there is no possibility that heat storage performance or the like decreases.

DETAILED DESCRIPTION OF THE INVENTION

Hereinafter, embodiments of a porous honeycomb heat storage structure of the present invention will be described with reference to the drawings. In addition, the porous honeycomb heat storage structure of the present invention is not limited to the following embodiments, and various design changes, modifications, improvements or the like can be added without departing from a scope of the present invention.

1. Heat Storage System

Figure 1:
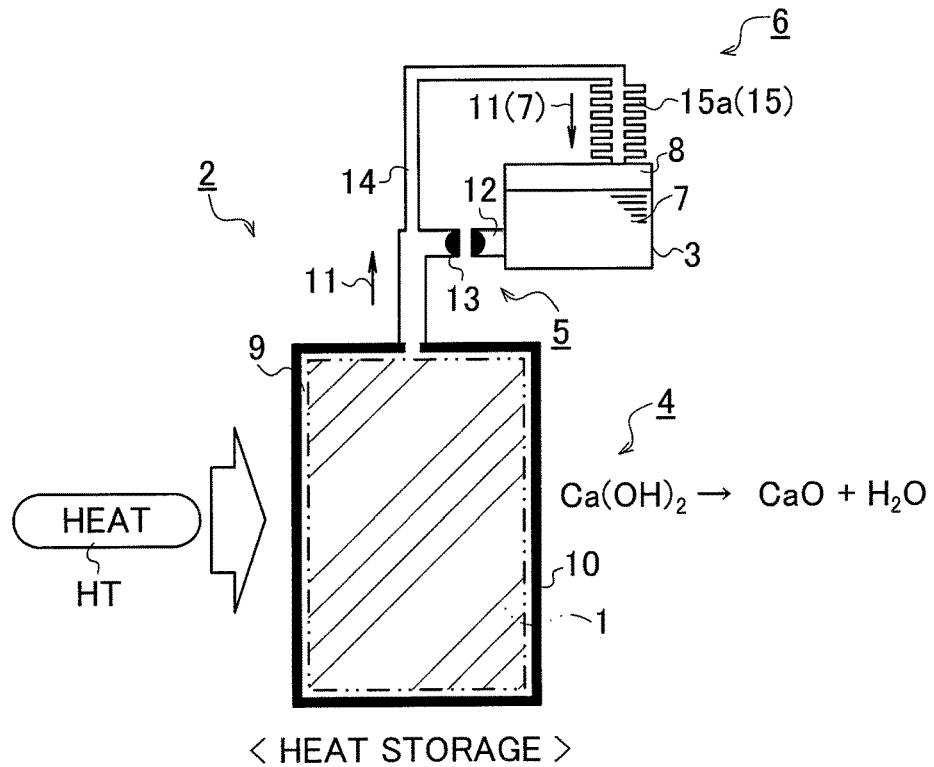
FIG. 1 is an explanatory view schematically showing a heat storage process in a heat storage system using a porous honeycomb structure of a present embodiment.
Figure 2:
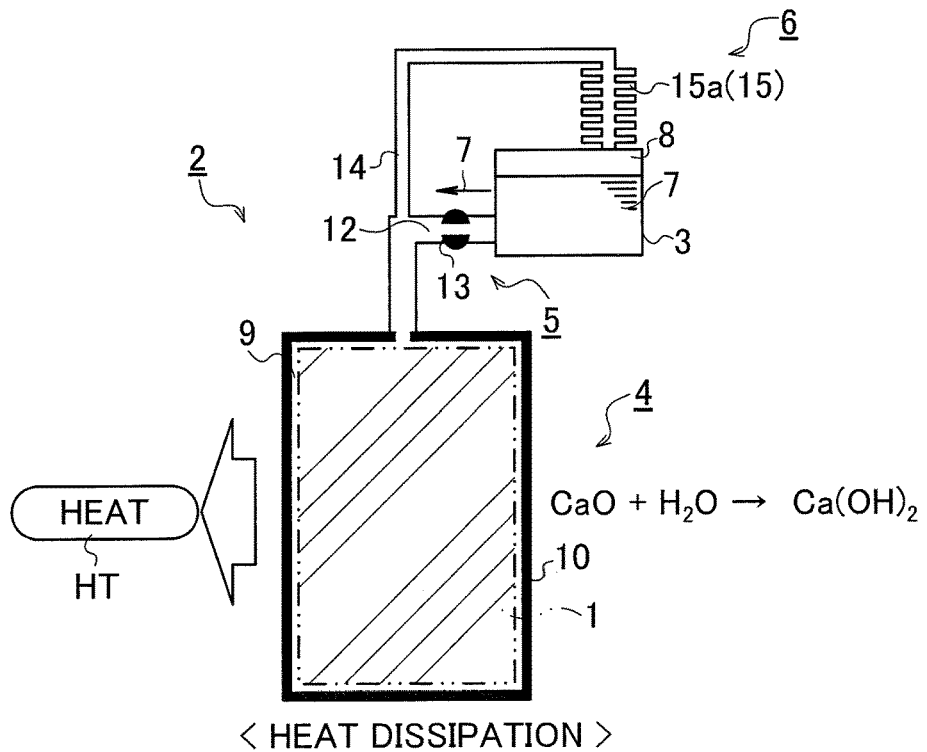
FIG. 2 is an explanatory view schematically showing a heat dissipation process in the heat storage system of FIG. 1.

As schematically shown in FIG. 1 and FIG. 2, a porous honeycomb heat storage structure 1 (hereinafter, referred to as a "heat storage structure 1") of an embodiment of the present invention can be adopted to be used as a portion of a heat storage system 2.

As shown in FIG. 1 and FIG. 2, the heat storage system 2 is configured to mainly include a liquid storage tank 3 which temporarily stores a liquid 7 serving as a reaction medium, a heat storage body 4 which includes the heat storage structure 1 performing heat storage and heat dissipation, a liquid injection mechanism portion 5 which injects the liquid 7 to the heat storage body 4, and a liquid recovery mechanism portion 6 which recovers the liquid 7 so as to reuse the liquid 7 from the heat storage body 4. Here, the liquid 7 corresponds to the reaction medium in the present invention.

Using the heat storage system 2 having the above-described configuration, it is possible to perform a heat storage process (refer to FIG. 1) of recovering externally applied heat HT by a chemical reaction (heat storage reaction and heat dissipation reaction) of the heat storage structure 1 of the present embodiment constituting a portion of the heat storage body 4 so as to temporarily store the heat HT and a heat dissipation process (refer to FIG. 2) of discharging the heat HT stored in the heat storage structure 1 toward an outside at an appropriate timing by contact between the heat T and the liquid 7.

Here, the heat storage system 2 can perform the heat storage process and the heat dissipation process in a reversible manner. That is, it is possible to repeatedly perform the heat storage and the heat dissipation using the heat storage structure 1. Here, as described above, in the heat storage structure 1 of the present embodiment, a so-called "chemical heat storage material" is used, which generates a chemical reaction by contact with the liquid 7 and can perform the heat storage and the heat dissipation. In particular, unless stated otherwise, descriptions shall be made assuming the "chemical heat storage material" below.

In addition, each configuration of the heat storage system 2, an effect thereof, or the like will be described in detail below. The liquid storage tank 3 has a tank structure or a bath structure which includes a liquid storage space 8 capable of temporarily storing the liquid 7 for generating the chemical reaction between the heat storage structure 1 constituting the heat storage body 4 (the details will be described later) and the liquid 7 inside the structure.

In addition, as long as the liquid 7 capable of being stored in the liquid storage space 8 generates the heat dissipation reaction or the like by the contact between the liquid 7 and the heat storage structure 1, for example, known "water" can be used as the liquid 7. The water is used as the liquid 7, and thus, advantages such as availability or an easiness of handling of the liquid 7 in the heat storage system 2 are obtained. Further, when the heat storage system 2 is constructed, special equipment is not necessary, and it is possible to easily cope with a case of leakage or like, and thus equipment cost and an operation cost can be reduced.

Here, in a case where the water is used as the liquid 7, a type of water is not particularly limited. For example, distilled water, ion-exchanged water, or the like can be used as appropriate in addition to normal water (tap water) and well water. As described above, in the heat storage system 2, the liquid 7 is recovered and reused. Therefore, for example, it is particularly preferable to use ion-exchanged water or the like which can be used over a long period of time by excluding components such as organic substances in advance.

Accordingly, a possibility of occurrence of the organic substances or the like in the liquid storage tank 3 and in the heat storage body 4 is suppressed, and an operation of replacing the liquid 7 is not necessary over a long period of time. Moreover, a material which constitutes the liquid storage tank 3 is not particularly limited. For example, a known material, that is, a metal material, a resin material, or a combination of these materials may be used, which has a certain degree of strength so as not to be damaged in a normal use condition and through which the stored liquid 7 does not leak to an outside.

Meanwhile, the heat storage body 4 is configured to mainly include the heat storage structure 1 (details will be described later) of the present embodiment capable of performing the heat storage and the heat dissipation by the chemical reaction between the liquid 7 and the heat storage structure 1, and an approximately hollow reaction container 10 which has a storage space 9 inside the reaction container 10 and can enclose the heat storage structure 1. Here, for example, the reaction container 10 can be mainly formed using a known metal material having improved heat conductivity such as stainless steel or steel. Furthermore, since the liquid 7 is injected to the storage space 9 and a periphery of the heat storage structure 1 needs to be filled with the liquid 7, the reaction container 10 has a liquid-tight structure in which the liquid 7 does not leak.

In addition, in the heat storage process by the heat storage structure 1, a gas 11 such as water vapor may be generated in the storage space 9. As a result, a pressure in the storage space 9 increases, a container wall (not shown) of the reaction container 10 is strongly pushed outward from the internal storage space 9, and thus, a force acts to expand the reaction container 10. Therefore, in order to prevent the reaction container 10 from expanding even when the increase in the pressure in the storage space 9 occurs, it is preferable to use a reaction container 10 having a pressure resistance and a durability without deformation of the container wall.

Meanwhile, the liquid injection mechanism portion 5 communicates with the liquid storage tank 3 and the reaction container 10 of the heat storage body 4 described above, and is configured to mainly include a tubular liquid flow pipe 12 for supplying the liquid 7 and a mechanism (injector) for feeding liquid 7 in the liquid storage tank 3 to the storage space 9 through the liquid flow pipe 12.

Moreover, in the heat storage system 2 using the heat storage structure 1 of the present embodiment, as the configuration of the injector, a configuration related to an injection valve 13 is adopted, which is provided in a middle of a pipeline of the liquid flow pipe 12 and can arbitrarily control an injection timing, an injection amount, or the like of the liquid 7. By opening the injection valve 13, the liquid 7 can be injected (supplied) from the liquid storage tank 3 to the storage space 9.

In the heat storage system 2 shown in FIG. 1 or the like, the injection valve 13 and the heat storage body 4 are shown at a position below a liquid level of the liquid 7 stored in the liquid storage tank 3. Therefore, by performing an opening operation of the injection valve 13, the liquid 7 in the liquid storage tank 3 flows downward according to the gravity. As a result, the liquid 7 is injected to the storage space 9 of the reaction container 10.

In addition, in addition to injecting the liquid 7 in accordance with the gravity as described above, an injector may be provided to further improve the diffusion of the heat storage structure 1. For example, in accordance with a timing of the opening operation of the injection valve 13, forced injection means for forcibly injecting the liquid 7 from the liquid storage tank 3 using compressed air or the like may be provided. As a result, a supply amount per unit time of the liquid 7 can increase, and the storage space 9 can be filled with liquid 7 in a short time. Therefore, the heat storage structure 1 and the liquid 7 can come into contact with each other rapidly, and the diffusion and responsiveness can be improved.

By using the heat storage system 2, the heat dissipation by the heat storage body 4 can be performed immediately after a start of the operation of the heat storage system 2, and compared to the related art, it is possible to further shorten a time until reaching a temperature (catalyst activation temperature) at which a catalyst is activated. In this case, for example, an opening/closing operation of the injection valve 13 can also be electromagnetically controlled using a known electromagnetic valve or the like. Thus, it is possible to finely control the timing of control of the heat storage system 2. In addition, the liquid injection mechanism portion 5 is not limited to the above-described configuration.

Meanwhile, the liquid recovery mechanism portion 6 is configured to mainly include a tubular discharge pipe 14 which communicates with the storage space 9 of the reaction container 10 and a cooling recovery portion 15 which discharges the gas 11 (for example, water vapor or the like) generated by the contact between the liquid 7 and the heat storage structure 1 through the discharge pipe 14 from the storage space 9 and cools the gas 11 so as to recover the gas 11 as a liquid 7.

In addition, although not shown in FIG. 1 and FIG. 2, in order to forcibly discharge the gas 11 from the storage space 9, for example, forced discharge means such as a suction pump (discharge pump) may be provided. Here, in the heat storage system 2 of FIG. 1 and FIG. 2, a portion of the discharge pipe 14 connected to the reaction container 10 is shared with a portion of the liquid flow pipe 12 of the above-described liquid injection mechanism portion 5, and the discharge pipe 14 branches off from the middle and is connected to the cooling recovery portion 15.

The gas 11 discharged from the storage space 9 is fed to the cooling recovery portion 15 connected to one end of the discharge pipe 14 and is cooled by the cooling recovery portion 15, and thus, a phase transition is performed from the gas 11 to the liquid 7. Here, the cooling recovery portion 15 is connected to the liquid storage tank 3, and the phase-transitioned liquid 7 is stored in the liquid storage space 8 of the liquid storage tank 3 again.

The cooling recovery portion 15 has a function which cools and liquefies the high-temperature gas 11, and for example, as shown in FIG. 1 and FIG. 2, the cooling recovery portion 15 includes a plurality of heat dissipation plates 15a and can adopt an air cooling system for performing the cooling by increasing a contact area with outside air or a refrigerant system for performing the cooling by contact with water, other refrigerants, or the like.

In this way, in the heat storage system 2, the heat HT is externally added, and the heat HT can be stored in the heat storage structure 1 accommodated in the reaction container 10 (heat storage process: refer to FIG. 1)). In addition, the liquid 7 is injected from the liquid storage tank 3, and thus, the heat HT can be released or discharged by the contact between the heat storage structure 1 storing the heat HT and the liquid 7 (heat dissipation process: refer to FIG. 2). The heat storage system 2 can repeatedly perform the heat storage process and the heat dissipation process.

In addition, as the processes are repeated, the liquid 7 injected from the liquid storage tank 3 to the heat storage body 4 is consumed in the heat dissipation process, and the gas 11 discharged from the reaction container 10 at the time of the heat storage process is phase-transitioned to the liquid 7 so as to be recovered. That is, the liquid 7 circulates through the heat storage system 2 and can be reused.

Here, in the heat storage system 2 of FIG. 1 and FIG. 2, the example is described in which calcium oxide (CaO) is used as the heat storage material and water ($H_2O$) is used as the reaction medium. In the heat storage process, the heat storage material exists in a form of calcium hydroxide ($Ca(OH)_2$), and in a step in which an environment temperature is equal to or more than a temperature at which the heat storage can be performed, the calcium hydroxide ($Ca(OH)_2$) is changed to calcium oxide (CaO) by an endothermic reaction (dehydration reaction) (refer to Chemical Formula in FIG. 1). In this state, the calcium oxide (CaO) and the water ($H_2O$) come into contact with each other, a heat generation reaction (hydration reaction) is generated, and the heat HT is discharged (see Chemical Formula in FIG. 2).

In this case, the calcium oxide (CaO) can be maintained as it is even if a temperature decreases, unless the calcium oxide (CaO) does not come into contact with the water. Therefore, the reaction container 10 or the like is not required to have a particular heat insulating structure. Moreover, the type of the used heat storage material may not be one type, and a plurality of heat storage materials may be mixed and used.

2. Heat Storage Structure

Figure 3:
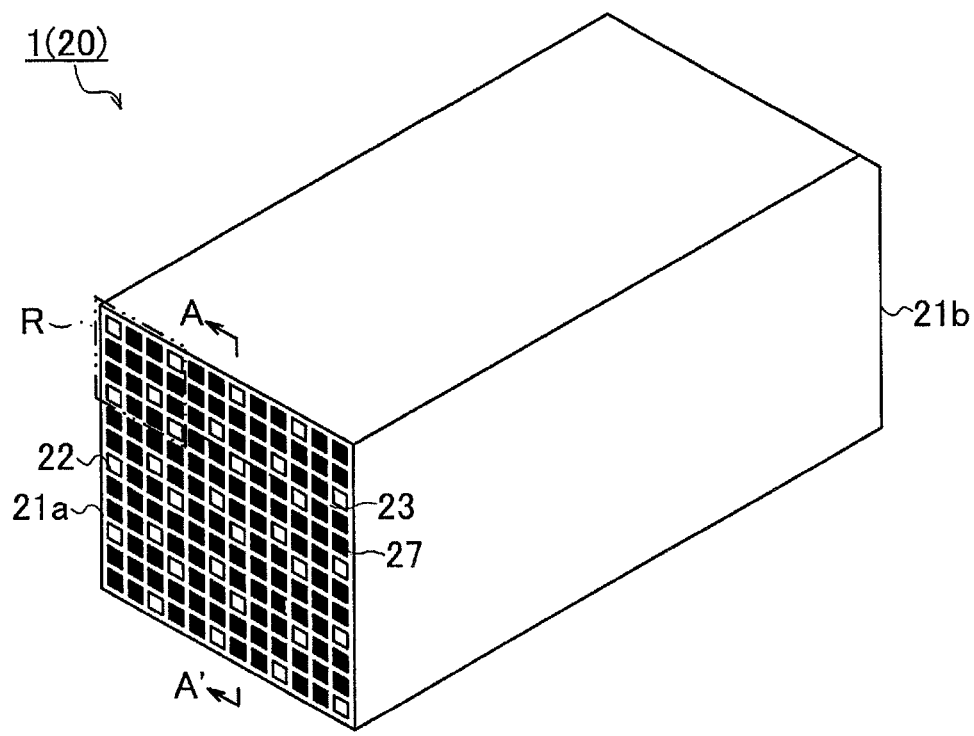
FIG. 3 is a perspective view showing a schematic configuration of a porous honeycomb heat storage structure.
Figure 4:
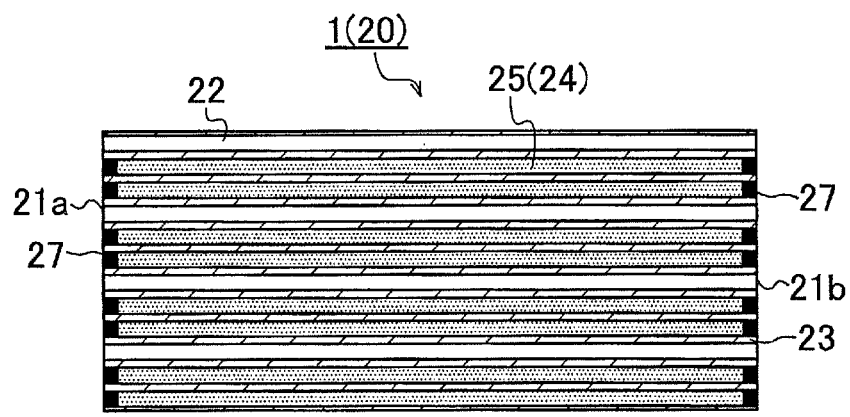
FIG. 4 is a sectional view when the schematic configuration of the porous honeycomb heat storage structure of FIG. 3 is taken along line A-A'.

Next, details of a configuration of the "heat storage structure 1" of the present embodiment capable of being adopted for the heat storage system 2 will be described. As shown in FIG. 3 and FIG. 4, the heat storage structure 1 of the present embodiment is configured to mainly include a ceramic honeycomb structure 20 which has porous partition walls 23 which define and form a plurality of cells 22 configured as a space extending from one end face 21a to the other end face 21b and allow the liquid 7 (corresponding to the reaction medium) to flow into the cells, and heat storage portions 25 which are configured by filling a heat storage material capable of performing the heat storage and the heat dissipation by a reversible chemical reaction with the liquid 7 in at least a portion of each cells 22.

An appearance shape of the honeycomb structure 20 is not particularly limited, and for example, has an approximately prismatic columnar structure as shown in FIG. 3 or an approximately round pillar-shaped structure or the like. The honeycomb structure 20 can be arbitrarily configured according to the shape of the storage space 9 of the reaction container 10 of the above-described heat storage body 4. In addition, a cell shape as a flow space between the one end face 21a and the other end face 21b, that is, a shape of an open end of the cell 22 is not particularly limited, and may be a circle, an ellipse, a triangle, a square, and other polygons.

The honeycomb structure 20 can be formed of a ceramic material known in the related art which is excellent in the heat resistance, a corrosion resistance, or the like. Details of the ceramic honeycomb structure 20 will be described later. In addition, a cell density or the like of the honeycomb structure 20 is not particularly limited. However, for example, preferably, the cell density is within a range of 100 cpsi to 900 cpsi (cells per square inch), in other words, within a range of 15.5 cells/cm$^2$ to 140 cells/cm$^2$.

If the value of the cell density is too low, the strength of the honeycomb structure 20 itself may be insufficient, and durability when used as the heat storage structure 1 may be impaired. Furthermore, a possibility that effective GSA (geometrical surface area) is insufficient increases. Meanwhile, if the cell density is too high, densification of the partition wall 23 or the like may occur, and there is a possibility that a pressure loss when the liquid 7 flows increases. Therefore, it is particularly preferable to set the cell density to the above-described range In addition, in the heat storage structure 1, an area ratio (hereinafter, simply referred to as a "heat storage portion area ratio") occupied by the heat storage portion 25 with respect to a cross sectional area of the honeycomb cross section 26 which is a cut cross section along a direction (corresponding to an upward-downward direction on a paper surface in FIG. 4 or FIG. 6) orthogonal to an axial direction (right-left direction on the paper surface in FIG. 4 or FIG. 6) of the honeycomb structure 20 is set to a range of 60% to 90%.

Figure 7:
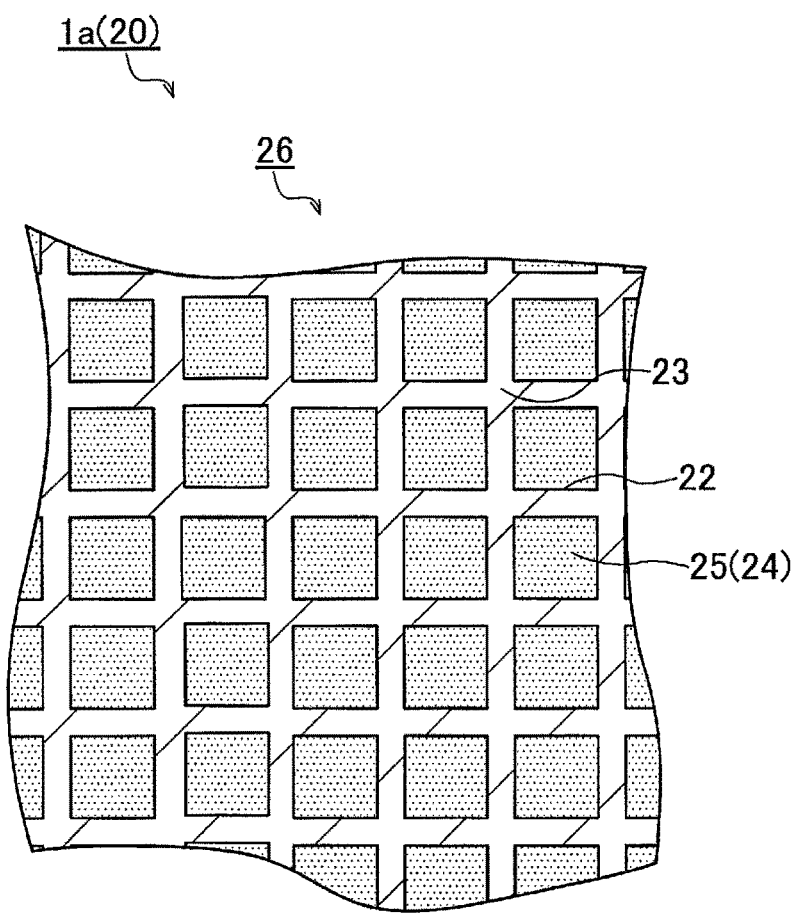
FIG. 7 is a partially enlarged sectional view showing a honeycomb cross section of the porous honeycomb heat storage structure of FIG. 5.

FIG. 7 is a partially enlarged sectional view of a honeycomb cross section 26 of a heat storage structure 1a in which the heat storage portions 25 are provided in all cells 22 in the honeycomb cross section 26. In this case, the heat storage portions 25 are provided in all the cells 22, and thus, cell filling rate=100%.

The heat storage portion area ratio is a ratio which is occupied by the heat storage portion total area obtained by adding all opening areas of the cells 22 provided with the heat storage portions 25 in the cross sectional area (the cross sectional area of the honeycomb cross section) of the honeycomb cross section 26, and can be calculated by "heat storage portion area ratio (%)=heat storage portion total area/cross sectional area of honeycomb cross section×100".

An increase in the value of the heat storage portion area ratio indicates that an amount of heat storage material 24 used per unit volume of the heat storage structure 1 is large. The heat storage structure 1 of the present embodiment is set such that the heat storage portion area ratio concerned is at least 60% or more, and thus, compared to the heat storage structure of the related art, many heat storage materials 24 are used. As a result, it is possible to increase heat absorption/heat generation amount per volume of the heat storage structure.

In a case where the heat storage portion area ratio is less than 60%, the amount of heat storage material 24 used per unit volume will be low, and thus, effects such as sufficient heat storage cannot be obtained. Meanwhile, if the heat storage portion area ratio exceeds 90%, the area occupied by the heat storage portion 25 increases, and thus, a partition wall thickness of the partition wall 23 defining and forming the cells 22 of the honeycomb structure 20 becomes thinner, or the number of the partition walls 23 decreases. As a result, the following many problems occur. That is, the strength of the honeycomb structure 20 decreases, the durability of the heat storage structure 1 decreases, and the heat storage structure 1 is easily damaged by impacts applied externally at the time of usage or the like. In addition, passages for reactants cannot be sufficiently secured, and the reaction rate decreases. Accordingly, the heat storage portion area ratio occupied by the heat storage portions 25 in the honeycomb cross section 26 is set to the above-described range.

In addition, the heat storage structure 1 of the present embodiment includes a plurality of plugging portions 27 which plug the one end face 21a side and the other end face 21b side of the cells 22 by the plugging materials to enclose the heat storage materials 24 in the cells 22 (refer to FIG. 3 and FIG. 4). Accordingly, the heat storage portion 25 formed by the heat storage material 24 filling each cell 22 does not flow out from the cell 22, and thus, an enclosed state of the heat storage portion 25 can be maintained.

Moreover, a filling rate (or enclosure volume rate) of the heat storage material 24 with respect to the cell 22 is not particularly limited. However, the filling rate can be set to be less than 100%, more preferably, to 70% to 90%, with respect to the space of the cell 22. Here, the filling rate (enclosure volume rate) is a ratio of the volume of the heat storage material 24 (heat storage portion 25) occupying the volume of the space of the cell 22 between the pair of plugging portions 27. Here, in a case where the filling rate is 100% or more, a portion of the heat storage portion 25 is expanded due to the heat generated by the heat dissipation process, and thus, there is a concern that the plugging portion 27 may be pushed out from the cell 22 or a portion of the heat storage portion 25 may leak from the cell 22. Accordingly, the filling rate is set to the above-described range.

The plugging portion 27 can be provided in the cell 22 of the honeycomb structure 20 by adopting a known method of the related art. As an example, a film is bonded to each of one end face 21a and the other end face 21b of the honeycomb structure 20, and a position corresponding to the cell 22 in which the plugging portion 27 is provided is irradiated with a laser, and thus, a perforated portion is provided in the film. Accordingly, a mask film for forming the plugging portion 27 is obtained.

Thereafter, a slurry-shaped plugging material (not shown) to be a raw material of the plugging portion 27 is placed on the mask film, and a squeegee is squeezed multiple times to fill the cell 22 with the plugging material at a position opposite to the perforated portion. In this case, the slurry-shaped plugging material contains a pore former such as starch, a resin, carbon, the like which is eliminated by oxidation at the time of baking. Thereafter, the plugging portion 27 having a predetermined plug depth is formed from one end face 21a or the like through processes such as drying. Here, as described above, the plugging material can use a ceramic material similar to the honeycomb structure 20 as the main component.

As described above, after the plugging portions 27 are formed on the one end face 21aside, the honeycomb structure 20 is placed such that the one end face 21a side faces downward. In addition, in the same manner as described above, a film is bonded to the other end face 21b, and at a position opposite to the cell 22 where the heat storage portion 25 and the plugging portion 27 are provided is irradiated with a laser, and thus, a perforated portion is formed. Accordingly, the mask film is completed. Thereafter, the heat storage material 24 mainly prepared in powder form from the perforated portion is charged into the inside of the cell 22 so as to fill the inside. A filling amount of the heat storage material 24 is adjusted such that the filling rate as described above is obtained.

Thereafter, similarly to the one end face 21a side, a slurry-shaped plugging material is placed on the mask film, the squeegee is squeezed to fill the cell 22 with the plugging material at a position opposite to the perforated portion, and thus, the plugging portion 27 is formed. Accordingly, the heat storage structure 1 of the present embodiment can be obtained, in which the heat storage portion 25 filled with the heat storage material 24 is formed for at least a portion of the cells 22 of the honeycomb structure 20.

Here, a porosity of the plugging portion 27 obtained by plugging one end face 21a and the other end face 21b of the cell 22 is set to be 48% or more. Accordingly, by setting the porosity of the plugging portion 27 to 48% or more, the liquid 7 serving as a reaction medium can flow into the plugging portion 27. As a result, a portion of the liquid 7 which has passed through the plugging portion 27 can reach the heat storage portion 25. Accordingly, it is possible to further increase the diffusion of the liquid 7.

As described above, the partition wall 23 of the honeycomb structure 20 constituting the heat storage structure 1 is also porous. Therefore, a portion of the liquid 7 injected from the liquid storage tank 3 to the storage space 9 of the reaction container 10 through the liquid injection mechanism portion 5 can reach the heat storage portion 25 while flowing through the inside of the porous partition wall 23 of the honeycomb structure 20. In addition, details of the porosity or the like of the honeycomb structure 20 will be described later.

Thus, the heat storage structure 1 of the present embodiment is particularly excellent in the diffusion of the liquid 7 as compared to a heat storage structure (heat storage member) of the related art which does not have the honeycomb shape. Therefore, the responsiveness (heat storage/dissipation speed) in the heat storage process and the heat dissipation process is excellent. Furthermore, since there is no bias in contact between each portion of the heat storage structure 1 and the liquid 7, there is no possibility that a temperature of a portion of the heat storage structure 1 is locally high. Therefore, a saturation of local heat HT does not occur, and good transmission of the heat HT can be performed.

As described above, the honeycomb structure 20 constituting the heat storage structure 1 is formed of a ceramic material, and the partition wall 23 defining and forming the plurality of cells 22 is formed of a porous partition wall material having a plurality of pores. Therefore, as described above, the liquid 7 serving as the reaction medium can easily pass through the inside of partition wall 23. Therefore, the liquid 7 easily come into contact with the heat storage portion 25 (heat storage material 24) positioned near (that is, a location positioned to be separated from each of the end face 21a and the other end face 21b) the center of the cell 22 of the honeycomb structure 20.

Here, the porosity of the partition wall 23 of the honeycomb structure 20 can be set to a range of 35% to 80%. Accordingly, the flow (or diffusion) inside the partition wall 23 of liquid 7 can be improved. That is, the partition wall 23 has the porosity of 35% or more, and thus, penetration and infiltration of liquid 7 into the interior of the partition wall 23 are easily performed. Accordingly, contact between the liquid 7 and the heat storage material 24 or the like is improved. Meanwhile, in a case where the porosity exceeds 80%, the strength of the partition wall 23 may be reduced. As a result, the strength of the entire honeycomb structure 20 or the entire heat storage structure 1 may be reduced and may be extremely weak against an external impact or the like. Therefore, an upper limit value of the porosity is set to 80% in order to provide sufficient strength for practical use which can resist the external impact or the like while securing a sufficient porosity. In addition, the porosity of the partition wall 23 and the porosity of the above-described plugging portion 27 can be measured by a known method (for example, a mercury intrusion method) of the related art.

In addition, a value of thermal conductivity of the partition wall 23 (honeycomb structure 20) may be 4 W/mK or more, and in particular, preferably, is set to 10 W/mK or more. Accordingly, when the heat storage portion 25 performs the heat storage and the heat dissipation, the heat conductivity of the partition wall 23 positioned around the heat storage portion 25 is good, and thus, the heat HT can be moved rapidly. As a result, for example, it is possible to rapidly increase the temperature of the catalyst for purifying the exhaust gas to the catalyst activation temperature using the above-described heat storage system 2, and even when the heat HT is externally applied, it is possible to recover and store the heat HT with improved efficiency. That is, the heat loss can be reduced in the processes of heat storage and the heat dissipation.

As a material constituting the honeycomb structure 20, for example, a Si/SiC-based ceramic material containing silicon (Si), silicon carbide (SiC), or the like as the main component, or a cordierite-based ceramic material containing cordierite as a main component can be used as an aggregate. A ceramic material containing other metal-bonded SiC or silicon nitride ($Si_3N_4$) and metal composite silicon nitride as a main component may be used. In addition, as the metal-bonded SiC or the like, metal-impregnated SiC, Si-bonded SiC, SiC bonded with metal Si and other metals, or the like can be exemplified. As other metals, aluminum (Al), nickel (Ni) copper (Cu), silver (Ag), beryllium (Be), magnesium (Mg), titanium (Ti), or the like can be used.

Further, as the plugging material for forming the above-described plugging portion 27, a material having the above-described Si/SiC-based ceramic material or the like as a main component can be used. The "main component" is a main component constituting the honeycomb structure 20 or the plugging portion 27. For example, the main component can be defined as a component which contains 50% by mass or more of silicon and silicon carbide (or cordierite) or the like with respect to the entire material, or as a component whose component ratio is highest.

In addition, a shock absorbing material, a spacer, or the like (not shown), which stabilizes an accommodation state of the heat storage structure 1 and reduces or absorbs an impact applied to the reaction container 10, may be provided between the heat storage structure 1 accommodated in the storage space 9 and an inner wall surface (not shown) of the reaction container 10.

Meanwhile, as the heat storage material 24 constituting the heat storage portion 25, a material is used, which can generate the chemical reaction by the contact with liquid 7 and can perform the heat dissipation (heat generation reaction) of discharging the heat HT and the heat storage (endothermic reaction) of absorbing the heat HT. Moreover, a material may be used, which can perform the heat dissipation and heat storage by physical adsorption and desorption in addition to the chemical reaction.

For example, as the heat storage material constituting the heat storage material 24, alkaline earth metal oxide such as barium oxide (BaO), magnesium oxide (MgO), calcium oxide (CaO), and strontium oxide (SrO), alkaline earth metal chloride such as calcium chloride ($CaCl_2$), or a mixture selected from these can be used. Furthermore, the heat storage material 24 is formed by mixing various binders with the heat storage material such as the alkaline earth metal oxide or the alkaline earth metal chloride. Here, in a case where the water is selected as the liquid 7 and the calcium oxide (CaO) is selected as the heat storage material 24, Chemical Reaction Formulas in the heat storage and the heat dissipation are shown in FIG. 1 and FIG. 2.

3. Arrangement Standard of Heat Storage Portion

In the heat storage structure 1 of the present embodiment, an arrangement standard for selectively providing the heat storage portions 25 and the plugging portions 27 for enclosing the heat storage portions 25 from among the plurality of cells 22 is not particularly limited. Here, in the heat storage structure 1 shown in FIG. 3 and FIG. 4, in a unit area R (refer to an inside of a frame shown by two-dot chain lines in FIG. 3) including 4 vertical cells×4 horizontal cells 22, the heat storage portions 25 (plugging portions 27) are provided for 11 cells 22, and the heat storage portions 25 (plugging portions 27) are not provided for 5 cells 22. By repeating this arrangement standard, the heat storage structure 1 of the present embodiment shown in FIG. 3 and FIG. 4 is constructed.

The above-described arrangement standard is an example and can be set arbitrarily. For example, in a case of a heat storage structure 1a having another configuration shown in FIGS. 5 to 7, the heat storage portions 25 (plugging portions 27) are provided for all of the plurality of cells 22 defined and formed in the honeycomb structure 20. Here, in the heat storage structure 1a of FIGS. 5 to 7, the same reference numerals are assigned to the same components as those of the above-described heat storage structure 1 (refer to FIGS. 3 and 4), and detailed descriptions thereof are omitted. By forming the heat storage portions 25 for all the cells 22, the amount of heat storage material 24 used per unit volume can be larger than that of the heat storage structure 1. In this case, the cell filling rate is 100%. Accordingly, it is possible to increase the heat storage effect and the heat dissipation effect by the heat storage material 24 and the heat storage portion 25.

Meanwhile, all cells 22 of the honeycomb structure 20 are filled with the heat storage materials 24 and blocked by the heat storage portions 25 and plugging portions 27, and thus, the diffusion of liquid 7 may be lower than that of the above-described heat storage structure 1, and accordingly, the responsiveness also decreases. Therefore, the heat storage structure 1 or the heat storage structure 1a may be used appropriately depending on a usage condition or the like.

As described above, in the heat storage structures 1 and 1a of the present embodiment, the diffusion of liquid 7 is excellent by providing the heat storage portions 25 filled with the heat storage material 24 in at least a portion of the cells 22 of the honeycomb structure 20, and it is possible to improve the responsiveness of the heat storage and the heat dissipation. In addition, by providing a plugging portion 27 having a high porosity of 48% or more, the liquid 7 easily flows from the one end face 21a side and the other end face 21b side of the honeycomb structure 20, and it is possible to prevent the heat storage material 24 (heat storage portion 25) enclosed in the cell 22 from flowing out from the cell 22.

In addition, according to the configuration in which the heat storage portions 25 are not provided for at least a portion of the cells 22, a flow path through which the liquid 7 flows can be secured between the one end face 21a and the other end face 21b, and thus, it is possible to shorten a supply time or an injection time of the liquid 7. The heat storage structure 1 having excellent reaction responsiveness can be obtained. In particular, by setting the area ratio of the heat storage portions 25 occupying the honeycomb cross section 26 of the heat storage structure 1 to at least 60% or more, the heat generation amount per unit volume can be made sufficiently high, and thus, it is possible to shorten the time to the reach catalyst activation temperature.

4. Combination of Different Cell Shapes

Figure 8:
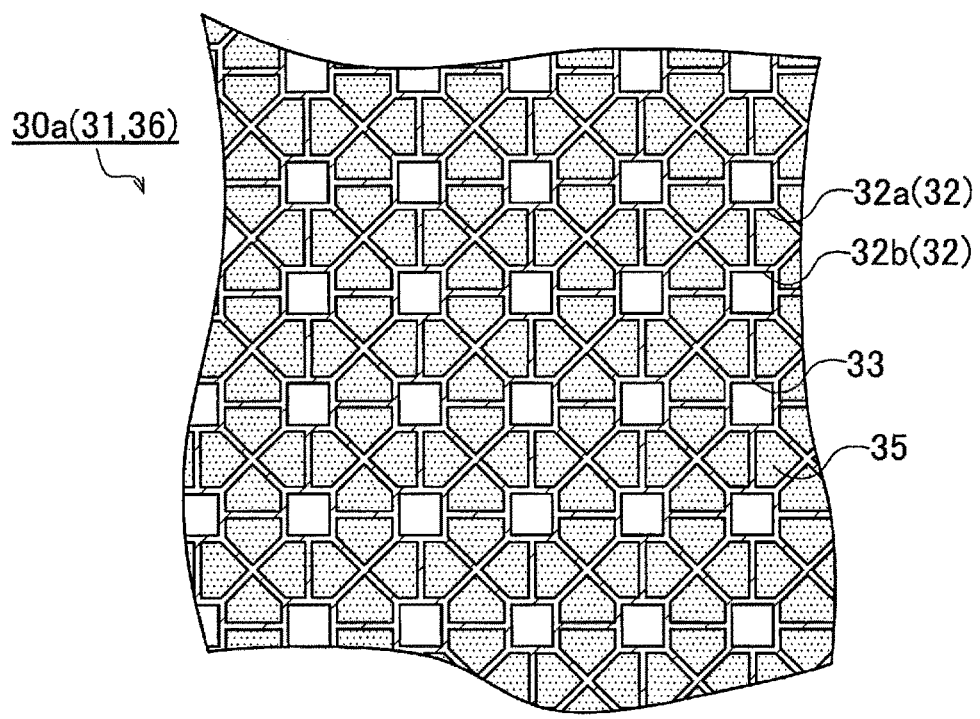
FIG. 8 is a partially enlarged sectional view showing a honeycomb cross section of a porous honeycomb heat storage structure of still another example.

As described above, the heat storage structure of the present invention is not limited to the configuration in which the cell shapes of the honeycomb cross section are the same as each other. For example, as shown in FIG. 8, a heat storage structure may be adopted, which includes at least two or more types of first cells 32a and second cells 32b having different cell shapes, different opening areas (cell area ratio) of cells, or the like and in which the cells 32a and 32b are arranged according to a predetermined arrangement standard. Here, the opening area of the cell is an area of an open end of each cell 32 in the honeycomb cross section 36 (refer to FIG. 8). In this case, the heat storage portion 25 may be formed in at least one of the first cells 32a and the second cells 32b. That is, the heat storage portion 25 may not be formed at all in the second cells 32b.

For example, as shown in FIG. 8, the cells 32 of the honeycomb structure 31 are configured by combining pentagonal home base type first cells 32a, first cells 32a and rectangular second cells 32b having a cell cross-sectional shape different from that of the first cells 32a, and the two types of cells 32a and 32b can be arranged according to a predetermined arrangement standard. Here, FIG. 8 is a partially enlarged sectional view showing a honeycomb cross section 36 of the heat storage structure 30a using the honeycomb structure 31 having partition walls 33 defined and formed by combining the first cells 32a and the second cells 32b described above.

More specifically, the honeycomb cross section 36 of the heat storage structure 30a shown in FIG. 8 is disposed by combining eight first cells 32a around one square-shaped second cells 32b. Here, a value of a first cells total open frontal area indicating a ratio of a total opening area of all the first cells 32a to the honeycomb cross section 36 in the honeycomb cross section 36 is set to be larger than a value of a second cells total open frontal area indicating a ratio of a total opening area of all the second cells 32b to the honeycomb cross section 36 in the honeycomb cross section 36 (condition A). Here, it is apparent from FIG. 8 or the like that the condition A of "first cells total open frontal area >second cells total open frontal area" is satisfied in the heat storage structure 30a. Furthermore, the heat storage portions 35 are formed for all the first cells 32a for which it is determined that the cells total open frontal area is larger (condition B).

Figure 9:
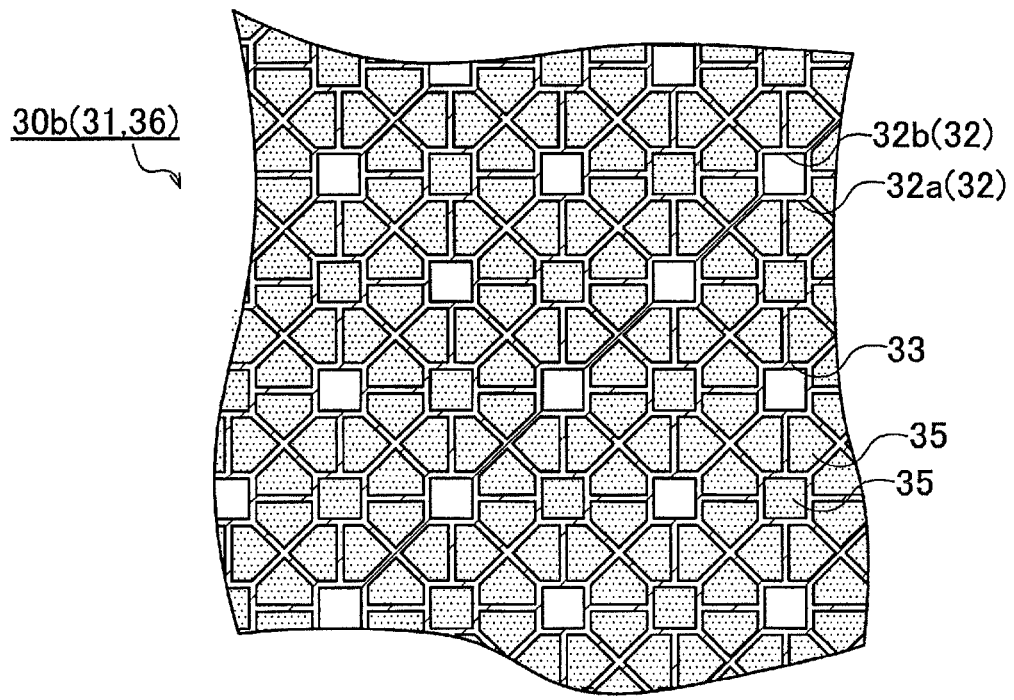
FIG. 9 is a partially enlarged sectional view showing a honeycomb cross section of a porous honeycomb heat storage structure in which a cell filling rate is changed.

That is, the heat storage structure 30a is configured to satisfy both the conditions A and B. In addition, in the second cells 32b, whether the heat storage portion 35 is to be formed can be set arbitrarily. Accordingly, while the heat storage structure 30a is provided in which all the second cells 32b do not have the heat storage portions 35 as shown in FIG. 8, a heat storage structure 30b can be adopted in which the heat storage portions 35 are provided in a portion of the second cells 32b according to a predetermined arrangement standard as shown in FIG. 9.

By combining the first cells 32a and the second cells 32b having different cell shapes like the heat storage structures 30a and 30b, the area ratio of the heat storage portion 35 to the cross sectional area of the honeycomb cross section 36 can be arbitrarily adjusted, and thus, the honeycomb structure 31 having sufficient strength can be obtained. Furthermore, it is also possible to adjust the diffusion of the liquid 7 passing through the inside of the heat storage structures 30a and 30b by arbitrarily setting the heat storage portion 35 provided on the second cells 32b side having the small cells total open frontal area.

Figure 10:
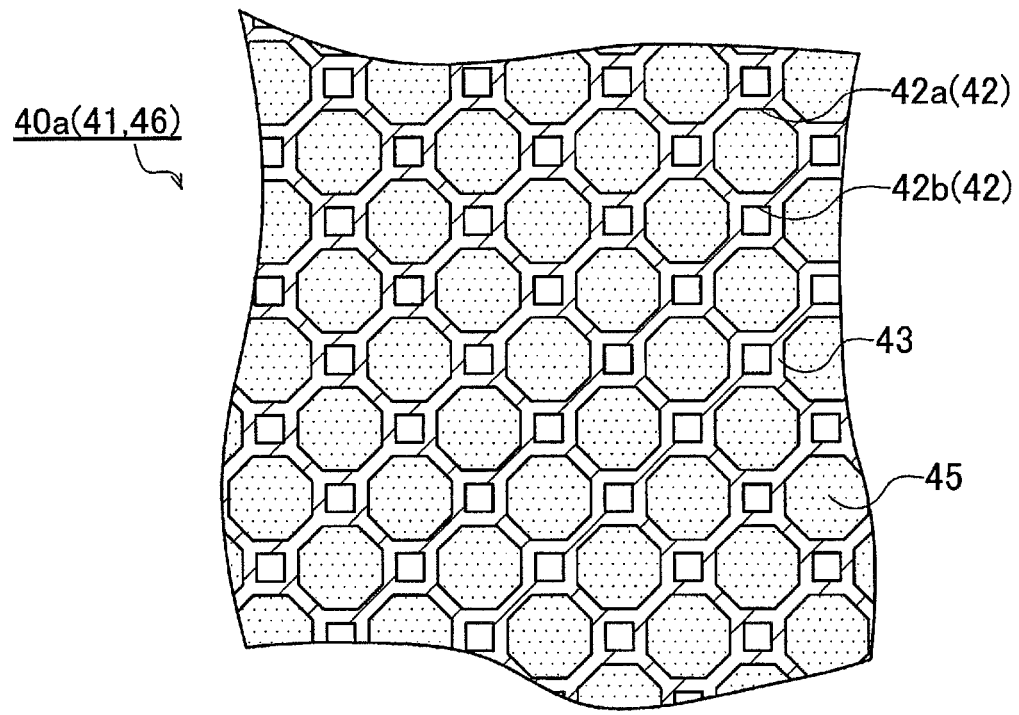
FIG. 10 is a partially enlarged sectional view showing a honeycomb cross section of a porous honeycomb heat storage structure of still another example.

In addition, as shown in FIG. 10, a heat storage structure 40a of another example can be configured, in which cells 42 of a honeycomb structure 41 are configured by combining octagonal first cells 42a and rectangular second cells 42b having a cell cross sectional shape different from that of the first cell 42a, and two types of cells 42a and 42b are disposed according to a predetermined arrangement standard. Here, FIG. 10 is a partially enlarged sectional view showing a honeycomb cross section 46 of the heat storage structure 40a using the honeycomb structure 41 having partition walls 43 defined and formed by combining the first cells 42a and the second cells 42b described above.

More specifically, the honeycomb cross section 46 of the heat storage structure 40a shown in FIG. 10 is disposed by combining four octagonal first cells 42a around one square-shaped second cell 42b. In addition, it is apparent from FIG. 10 that a first cells total open frontal area of the first cells 42a is larger than a second cells total open frontal area of the second cells 42b. Accordingly, the condition A is satisfied, and the heat storage portions 45 are formed in all of the first cells 42a in which the cells total open frontal area is large (condition B).

Figure 11:
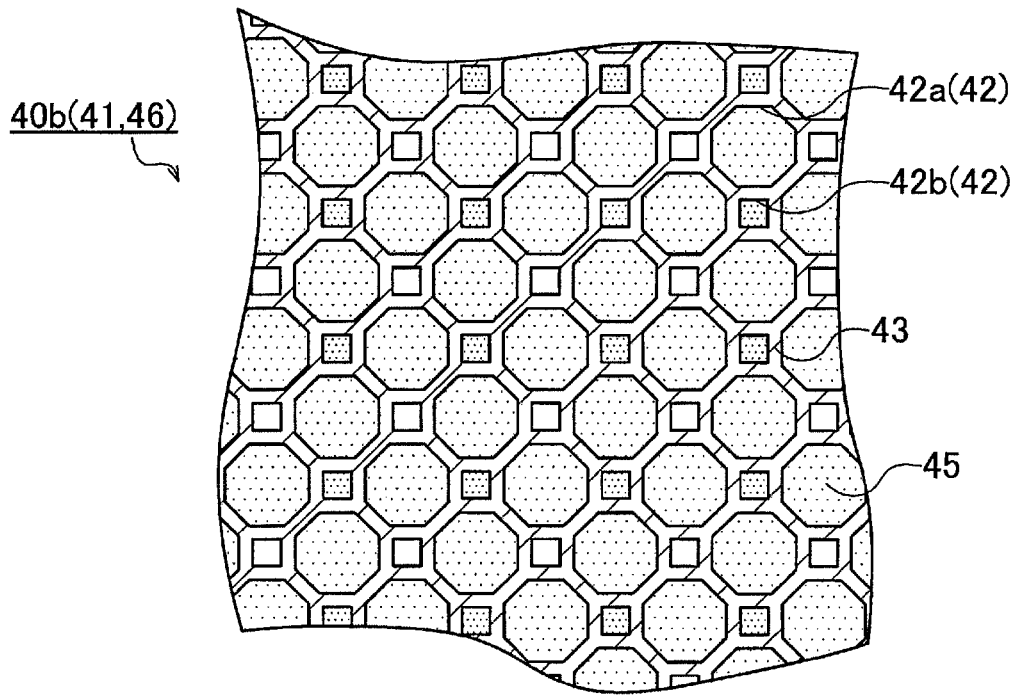
FIG. 11 is a partially enlarged sectional view showing a honeycomb cross section of a porous honeycomb heat storage structure in which the cell filling rate is changed.

Furthermore, whether or not to provide the heat storage portion 45 in the second cell 42b can be arbitrarily set. Accordingly, while the heat storage structure 40a is provided in which the heat storage portion 45 is not formed at all in the second cell 42b as shown in FIG. 10, a heat storage structure 40b can be adopted in which the heat storage portions 45 are provided in a portion of the second cells 42b according to a predetermined arrangement standard, as shown in FIG. 11.

Figure 12:
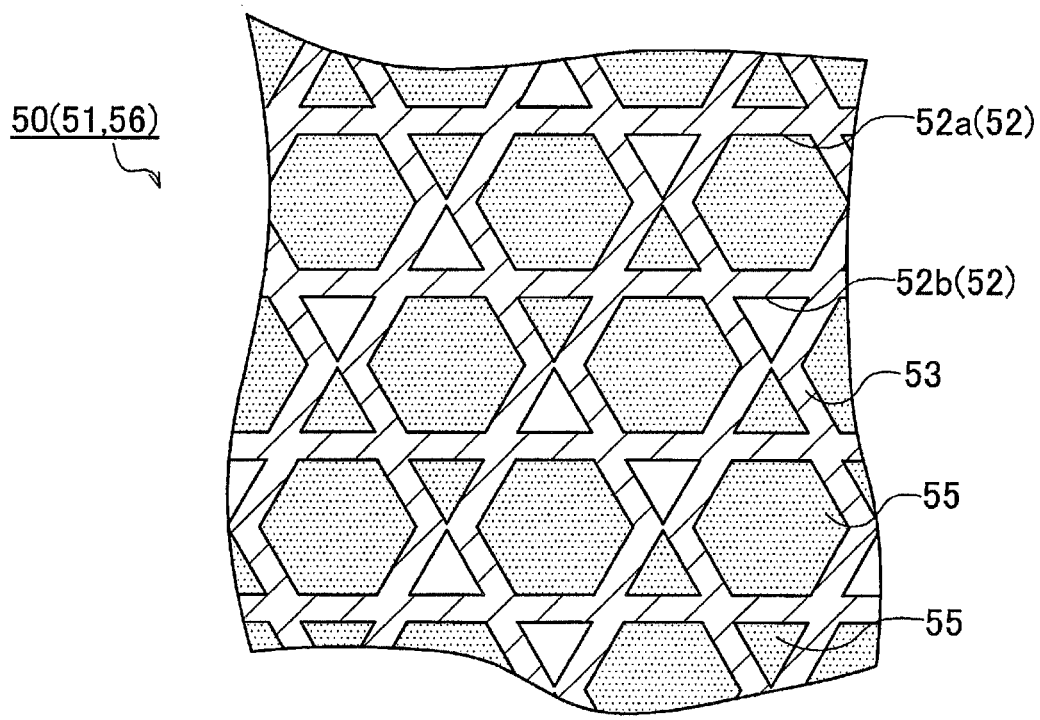
FIG. 12 is a partially enlarged sectional view showing a honeycomb cross section of a porous honeycomb heat storage structure of still another example.

In addition, as shown in FIG. 12, as a heat storage structure 50 of still another example, the heat storage structure 50 can be configured, in which cells 52 of a honeycomb structure 51 are configured by combining hexagonal first cells 52a and triangular second cells 52b having a cell shape different from that of the first cell 52a, and two types of cells 52a and 52b are disposed according to a predetermined arrangement standard. Here, FIG. 12 is a partially enlarged sectional view showing a honeycomb cross section 56 of the heat storage structure 50 using the honeycomb structure 51 having partition walls 53 defined and formed by combining the first cells 52a and the second cells 52b described above. In the heat storage structure 50, heat storage portions 55 are provided in a portion of the second cells 52b according to a predetermined arrangement standard.

As described above, as long as the cells having at least two types or more different cell shapes are combined and a flow path through which the liquid 7 can flow is secured, any heat storage structure can be used.

Hereinafter, Examples of the porous honeycomb heat storage structure of the present invention will be described. However, the porous honeycomb heat storage structure (heat storage structure) of the present invention is not limited to Examples.

EXAMPLES

1. Manufacture of Honeycomb Structure

A clay having a Si/SiC-based ceramic material as the main component is prepared, and a honeycomb formed body having partition walls which define and form a plurality of cells is formed by extrusion. Thereafter, baking was performed under an inert gas atmosphere at a predetermined baking temperature to obtain honeycomb structures of Examples 1 to 11 and Comparative Examples 2 to 4. In addition, since the formation of the honeycomb formed body and the manufacturing method of the honeycomb structure are well-known, detailed descriptions thereof are omitted. In addition, Comparative Example 1 is a billet (block-shaped) heat storage structure of the related art using a Si/SiC-based ceramic material which does not have a honeycomb structure.

Here, by changing a type of a die attached to an extrusion machine which extrudes the clay, it is possible to obtain an arbitrary cell shape of the honeycomb structure. Here, Examples 1 to 6 are honeycomb structures (refer to FIG. 3 to FIG. 7) having rectangular cells, Examples 7, 8, and 11 are honeycomb structures (refer to FIG. 8 and FIG. 9) configured by combining pentagonal first cells and rectangular second cells, and Examples 9 and 10 are honeycomb structures (refer to FIG. 10 and FIG. 11) configured by combining octagonal first cells and rectangular second cells.

2. Formation of Heat Storage Portion and Plugging Portion

The cells of each honeycomb structure obtained by the above 1 were filled with the heat storage materials according to a predetermined arrangement standard, the plugging portions were formed on the one end face and the other end face, and thus, the heat storage portions in which the heat storage materials were enclosed inside the cells were provided. Details of the formations of the heat storage portion and the plugging portion are already described, and thus, here, detail descriptions thereof are omitted.

Here, in Examples 1 to 3, the amount of cells in which the heat storage portions are provided is changed, that is, the cell filling rate is changed. Here, the heat storage portions are provided in 80% cells of all cells of the honeycomb cross section (cell filling rate=80%) in Example 1, the cell filling rate is set to 75% in Example 2, and the heat storage portions are provided in all cells in Example 3 (cell filling rate=100%). In Examples 4 to 6, the filling rate is set to 100%, and the cell density and the partition wall thickness of the honeycomb structure are changed. Moreover, in Examples 1 to 6, the porosity of the plugging portion is 48% in only Example 5, and the porosity is set to 63% in other Examples.

In Example 7, pentagonal first cells and rectangular second cells (rectangular cells) are provided, the heat storage portions are provided in only the first cells, and the heat storage portions are not provided in the rectangular second cells (the cell filling rate of the rectangular cells=0%), and in Example 8, the cell filling rate of the rectangular cells is set to 50%. In addition, in Example 9, octagonal first cells and rectangular second cells (rectangular cells) are provided, the heat storage portions are provided in only the first cells, and the heat storage portions are not provided in the rectangular second cells (the cell filling rate of the rectangular cells=0%). In Example 10, the cell filling rate of the rectangular cells is set to 50%, and in FIG. 11, the same rectangular cells as those of Example 8 are provided, the cell filling rate is set to 50%, and the value of the thermal conductivity is set to 11 W/mK.

Meanwhile, in Comparative Example 2, a honeycomb structure similar to that of Example 6 is used, and the area ratio of the heat storage portion is set to 31.40%. In Comparative Example 3, a honeycomb structure similar to those of Examples 1 to 3 is used, and the area ratio of the heat storage portion is set to be less than 60%. In Comparative Example 4, the porosity of the plugging portion is set to 35% in Example 1.

As described above, by changing the cell filling rate of the heat storage portion with respect to the cell, it is possible to change the area ratio of the heat storage portion in the honeycomb cross section. The partition wall thicknesses, the thermal conductivities of the partition walls, the porosities of the partition walls, the cell densities, the porosities of the plugging portions, the open frontal areas of the honeycombs, and the heat storage portion area ratios in the honeycomb structures of the heat storage structures in Examples 1 to 11 and Comparative Examples 1 to 4 are collectively shown in the following Table 1. In addition, a size of each of the heat storage structures of the obtained Examples 1 to 11 and Comparative Examples 1 to 4 is 35 mm in diameter×50 mm in length, and the heat storage structure has an approximately round pillar shape.

TABLE 1

Figure 5:
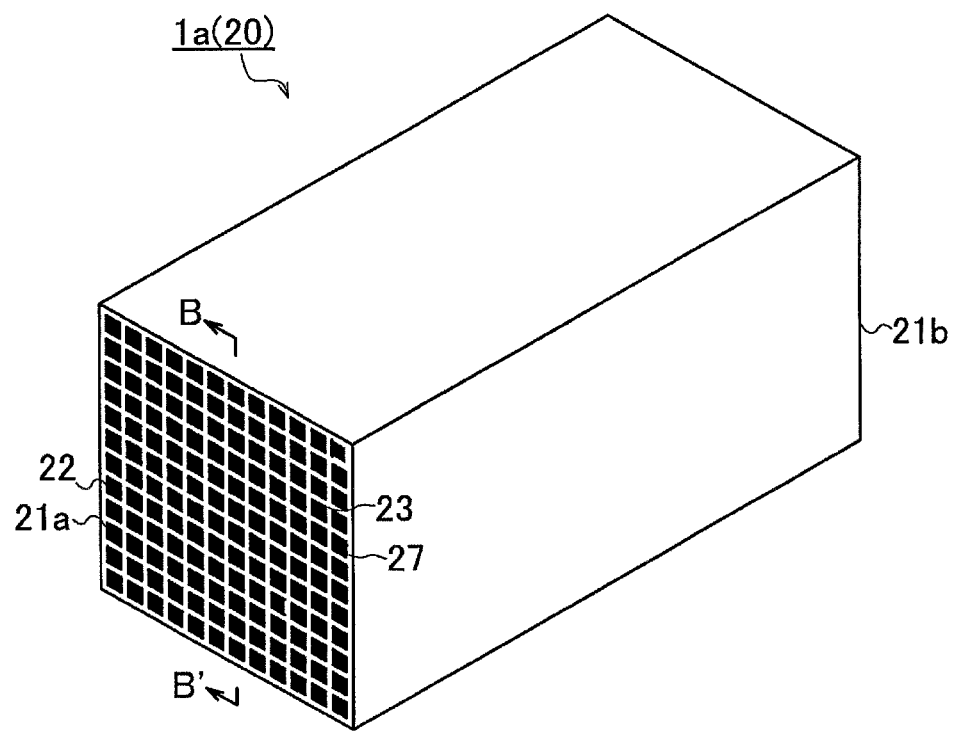
FIG. 5 is a perspective view showing a schematic configuration of a porous honeycomb heat storage structure of another example.
Figure 6:
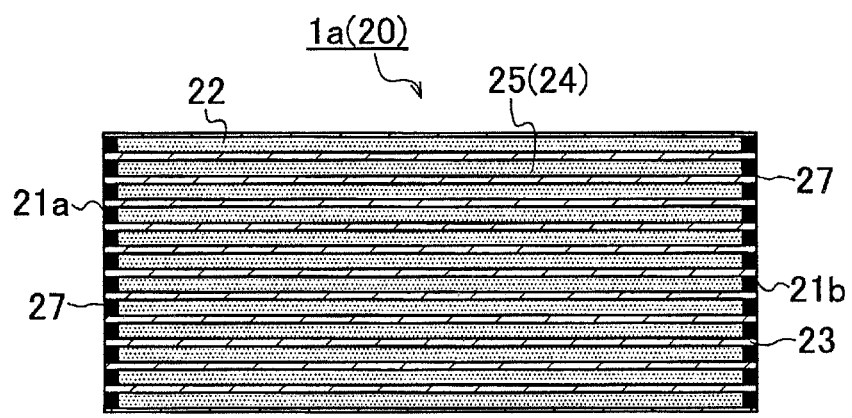
FIG. 6 is a sectional view when the schematic configuration of the porous honeycomb heat storage structure of FIG. 5 is taken along line B-B'.

|  | Cell filling rate % | Reference drawing | Partition wall thickness mm | Thermal conductivity of partition wall W/mK | Porosity of partition wall % | Cell density cells/cm² | Porosity of plugging portion % |
|---|---|---|---|---|---|---|---|
| Example 1 | 80 | FIGS. 3 and 4 | 0.10 | 4 | 63 | 62.0 | 63 |
| Example 2 | 75 | FIGS. 3 and 4 | 0.10 | 4 | 63 | 62.0 | 63 |
| Example 3 | 100 | FIGS. 5, 6, and 7 | 0.10 | 4 | 63 | 62.0 | 63 |
| Example 4 | 100 | FIGS. 5, 6, and 7 | 0.08 | 4 | 63 | 93.0 | 63 |
| Example 5 | 100 | FIGS. 5, 6, and 7 | 0.06 | 4 | 63 | 140.0 | 63 |
| Example 6 | 100 | FIGS. 5, 6, and 7 | 0.31 | 4 | 63 | 46.5 | 48 |
| Example 7 | 0* | FIG. 8 | 0.23 | 4 | 63 | 21.1 | 63 |
| Example 8 | 50* | FIG. 9 | 0.23 | 4 | 63 | 21.1 | 63 |
| Example 9 | 0* | FIG. 10 | 0.20 | 4 | 63 | 46.5 | 63 |
| Example 10 | 50* | FIG. 11 | 0.20 | 4 | 63 | 46.5 | 63 |
| Example 11 | 50* | FIG. 9 | 0.23 | 11 | 63 | 21.1 | 63 |
| Comparative Example 1 | — | — | — | — | — | — | — |
| Comparative Example 2 | — | — | 0.31 | 4 | 60 | 46.5 | 35 |
| Comparative Example 3 | 65 | — | 0.10 | 4 | 60 | 62.0 | 63 |
| Comparative Example 4 | 80 | — | 0.10 | 4 | 60 | 62.0 | 35 |

|  | Open frontal area of honeycomb % | Heat storage portion area ratio % | Heat generation amount after repeated three times (good: 0.5 kJ/L to 0.8 kJ/L) kJ/L | evaluation | Heat generation peak arrival time (good: 300 s or less) sec | evaluation | Comprehensive evaluation |
|---|---|---|---|---|---|---|---|
| Example 1 | 84.60 | 67.68 | 0.61 | good | 280 | good | good |
| Example 2 | 84.60 | 63.45 | 0.57 | good | 200 | good | good |
| Example 3 | 84.60 | 84.60 | 0.76 | good | 260 | good | good |
| Example 4 | 85.80 | 85.80 | 0.77 | good | 260 | good | good |
| Example 5 | 85.60 | 85.60 | 0.77 | good | 260 | good | good |
| Example 6 | 62.80 | 62.80 | 0.57 | good | 220 | good | good |
| Example 7 | 79.40 | 60.00 | 0.54 | good | 160 | good | good |
| Example 8 | 79.40 | 70.00 | 0.63 | good | 180 | good | good |
| Example 9 | 74.20 | 61.00 | 0.55 | good | 180 | good | good |
| Example 10 | 74.20 | 77.00 | 0.69 | good | 190 | good | good |
| Example 11 | 79.40 | 70.00 | 0.80 | good | 140 | good | good |
| Comparative Example 1 | — | — | 0.90 | impossible | 600 | impossible | impossible |
| Comparative Example 2 | 62.80 | 31.40 | 0.28 | impossible | 250 | good | impossible |
| Comparative Example 3 | 84.60 | 54.99 | 0.49 | impossible | 200 | good | impossible |
| Comparative Example 4 | 84.60 | 67.68 | 0.40 | impossible | 500 | impossible | impossible |

*indicates a filling rate to rectangular cells.

3. Evaluation of Heat Storage Structure

Figure 13:
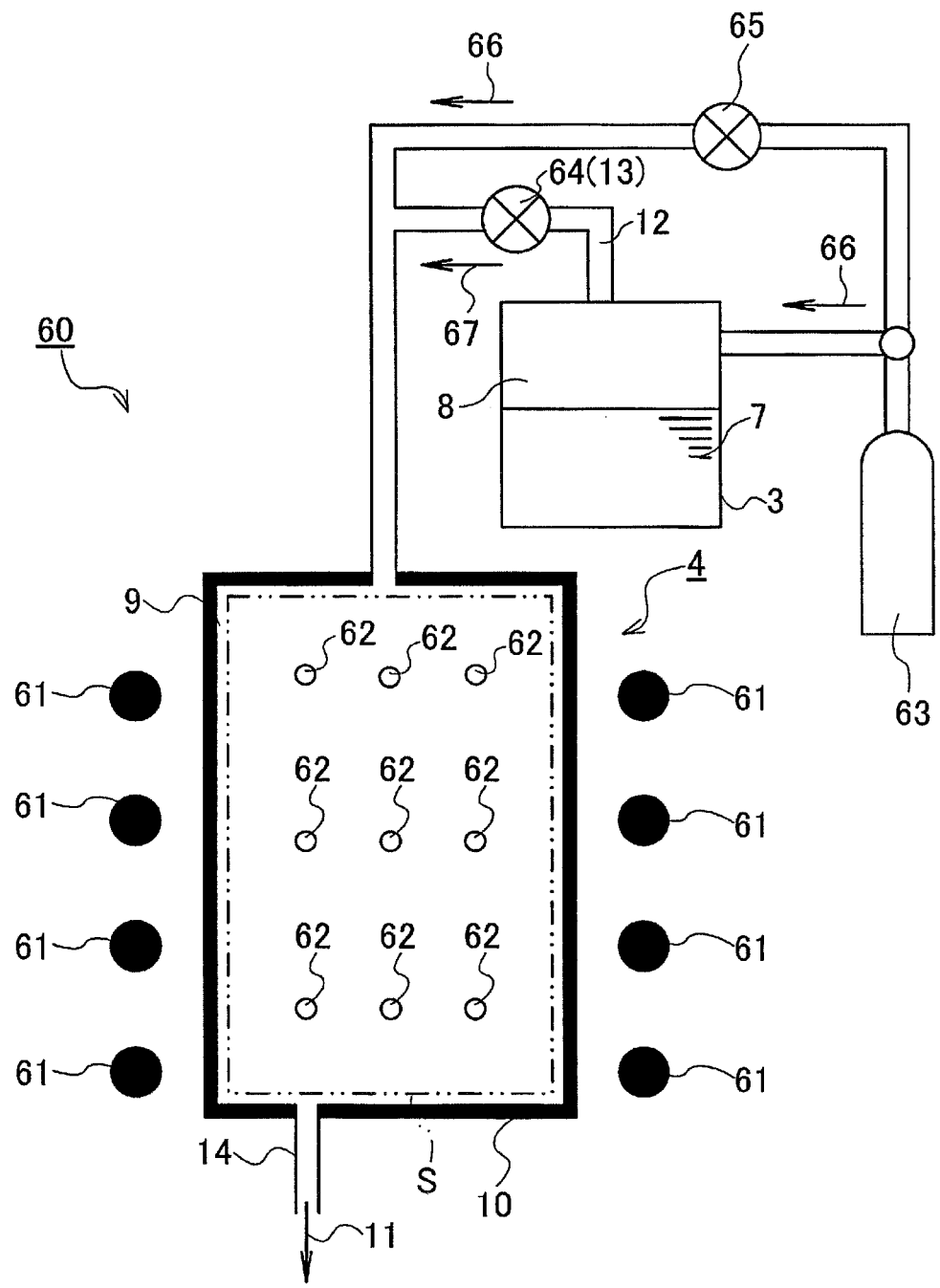
FIG. 13 is an explanatory view schematically showing an experimental apparatus for measuring a heat generation amount and a heat generation peak arrival time.

As shown in FIG. 13, an experimental device 60 was constructed, and evaluations were performed on the heat storage structures of Examples 1 to 11 and Comparative Examples 1 to 4 manufactured according to the above 1 and 2. Here, in FIG. 13, the same reference numerals are assigned to the same configurations as those of the heat storage system (FIG. 1 and FIG. 2) described above, and detailed descriptions thereof are omitted. In the experimental device 60, measurement samples S of Examples 1 to 11 and Comparative Examples 1 to 4 for measuring the heat generation amount and the heat generation peak arrival time are set in a state of being accommodated in reaction container 10, respectively. In addition, thermocouples 62 are attached to a plurality of locations of the measurement sample S, and the temperatures of the respective portions in the heat storage process and the heat dissipation process can be measured.

4. Evaluation of Heat Generation Amount

4.1 Preparation of Measurement of Heat Generation Amount

First, a first valve 64 is closed, and a second valve 65 is opened. In addition, heaters 61 are operated, an air cylinder 63 is operated, dry air 66 flows at a pressure of 0.02 MPa, and heating of the measurement sample S (heat storage structure of the present invention) which is accommodated in the reaction container 10 is started. The heat of the heaters 61 is gradually transmitted to the measurement sample S, and the temperature of the measurement sample S increases. As a result, the water contained in the measurement sample S becomes the gas 11 (water vapor) and is discharged to the outside of the reaction container 10 through the discharge pipe 14. Thereafter, in a state where the first valve 64 is closed and the second valve 65 is opened, the operations of the heaters 61 are stopped while the dry air 66 continues to flow. Accordingly, the measurement sample S is cooled to an ambient temperature (heat storage process).

4.2 Measurement of Heat Generation Amount

As described above, the operations of the heaters 61 are stopped, and the second valve 65 is closed and the first valve 64 is opened for the measurement sample S cooled to the ambient temperature. In this state, the air cylinder 63 is operated to cause the dry air 66 to flow toward the liquid storage tank 3 at a pressure of 0.02 MPa. Accordingly, saturated water vapor 67 containing the liquid 7 (water) and the dry air 66 is fed from the liquid storage tank 3 to the reaction container 10. In this case, the temperature of the dry air 66 is set to 25° C. The saturated water vapor 67 is diffused into the inside of the measurement sample S in the reaction container 10. Accordingly, contact between the measurement sample S (the heat storage structure) and the liquid 7 in the saturated water vapor 67 is generated, and heat is generated by the chemical reaction with the heat storage materials filled in the honeycomb structure (heat dissipation process). In this case, the heat generation amount is calculated based on an average (average temperature) of the temperatures measured by the thermocouples 62 attached to the plurality of locations of the measurement sample S, and heat capacity of each of the honeycomb structure and the heat storage material filling the honeycomb structure. Specifically, the heat generation amount is obtained by the following Calculation Expression.

Calculation Expression

Heat generation amount=average temperature of thermocouple×(heat capacity of honeycomb structure+heat capacity of heat storage material)

The heat generation amount of the heat storage structure (measurement sample S) after repeating the heat storage process and the heat dissipation process in the above 4.1 and 4.2 three times was obtained. The results are shown in Table 1. Here, a case where the value of heat generation amount is 0.5 kJ/L or more and 0.8 kJ/L or less was regarded as "good", and a case where the value of heat generation amount deviates from the above range was regarded as "impossible".

5. Measurement of Heat Generation Peak Arrival Time

In the measurement of the heat generation amount using the experimental device 60 shown in FIG. 13, a temperature change of the measurement sample S after the supply of the saturated water vapor 67 containing the liquid 7 was started was measured by the thermocouples 62 attached to a plurality of locations. In this case, a time (heat generation peak arrival time) from the start of the supply of the saturated water vapor 67 to the maximum temperature was measured. The measurement results are shown in Table 1. Here, a case where the heat generation peak arrival time is 300 s or less was regarded as "good", and a case where the heat generation peak arrival time exceeds 300 s was regarded as "impossible".

6. Evaluation 6.1 Evaluation of Heat Generation Amount After Processes Repeated Three Times As shown in Table 1, in each of Examples 1 to 11, the value of the heat generation amount after the processes were repeated three times was in a range of 0.5 kJ/L to 0.8 kJ/L and showed good results. That is, it was confirmed that there were repeat durabilities of the heat storage process and the heat dissipation process. On the other hand, in Comparative Example 2 in which the cells do not have the heat storage portions, the heat generation amount after the processes were performed three times was extremely low (0.28 kJ/L). In addition, in Comparative Example 3 in which the heat storage portion area ratio is low and Comparative Example 4 in which the porosity of the plugging portion is low, it was confirmed that the heat generation amount after the processes are repeated three times was lower than a reference range. Therefore, it was confirmed that the heat storage portion area ratio was required to be set to 60% or more and the plugging portion was required to be formed with a high porosity (48% or more).

6.2 Evaluation of Heat Generation Peak Arrival Time

From the measurement of the heat generation peak arrival time, it was confirmed that in each of Examples 1 to 11, the temperature reached the maximum temperature within 300 s or less, and in particular, each of Examples 7 to 10 having different cell shapes showed a good result of 200 s or less. That is, as in the heat storage structure of the present invention, it was confirmed that an aspect including the honeycomb structure having the partition walls defining and forming the cells and the heat storage portions filling the cells was effective. In addition, as shown in Example 1 and Example 2, Example 7 and Example 8, or Example 9 and Example 10, as the cell filling rate decreases, that is, the cells which are not filled with the heat storage portions in the honeycomb cross section increase, it was confirmed that the heat generation peak arrival time is shortened. Accordingly, it was shown that the lower the cell filling rate, the better the liquid diffusion. This tendency was also shown in the evaluation of the heat generation amount of the above-described 6.1.

Meanwhile, in the case of a block-shaped heat storage structure formed of a ceramic material of the related art (Comparative Example 1), which does not have the aspect of the present invention, it was shown that the heat generation peak arrival time becomes significantly long. Furthermore, as shown in Comparative Example 4, in a case where the porosity of the plugging portion is low (35%), it was shown that the heat generation peak arrival time becomes long. Accordingly, it was confirmed that the presence or absence of the cell and the porosity of the plugging portion greatly contribute to the diffusion of the liquid, in other words, the responsiveness of the heat storage structure.

7. Comprehensive Evaluation

In a case where both evaluation results in the above 6.1 and 6.2 were "good", a comprehensive evaluation was regarded as "good", and in a case where at least one of the evaluation results was "impossible", the comprehensive evaluation was regarded as "impossible". Accordingly, it was confirmed that Examples 1 to 11 have practically sufficient performance as a heat storage structure.

INDUSTRIAL APPLICABILITY

A porous honeycomb heat storage structure of the present invention can be used in a heat storage system which is mounted on the automobile or the like, recovers or stores the heat of exhaust gas, and uses the stored heat to activate a catalyst when an engine starts next time.

DESCRIPTION OF REFERENCE NUMERALS 1, 1a, 30a, 30b, 40a, 40b, 50: heat storage structure (porous honeycomb heat storage structure), 2: heat storage system, 3: liquid storage tank, 4: heat storage body, 5: liquid injection mechanism portion, 6: liquid recovery mechanism portion, 7: liquid (reaction medium, water), 8: liquid storage space, 9: storage space, 10: reaction container, 11: gas, 12: liquid flow pipe, 13: injection valve, 14: discharge pipe, 15:

cooling recovery portion, 20, 31, 41, 51: honeycomb structure, 21*a*: one end face, 21*b*: other end face, 22, 32, 42, 52: cell, 23, 33, 43, 53: partition wall, 24: heat storage material, 25, 35, 45, 55: heat storage portion, 26, 36, 46, 56: honeycomb cross section, 27: plugging portion, 32*a*, 42*a*, 52*a*: first cell, 32*b*, 42*b*, 52*b*: second cell, 60: experimental device, 61: heater, 62: thermocouple, 63: air cylinder, 64: first valve, 65: second valve, 66: dry air, 67: saturated water vapor, HT: heat, R: unit region, S: measurement sample

The invention claimed is:

1. A porous honeycomb heat storage structure comprising:
   a honeycomb structure which has a porous partition wall which defines a plurality of cells extending from one end face to another end face and allows a reaction medium to flow into the cells; and
   a heat storage portion which is configured by filling a heat storage material performing heat storage and heat dissipation by a reversible chemical reaction with the reaction medium or physical adsorption/desorption in at least a portion of each cells,
   wherein the heat storage portion has an area ratio in a range from 60% to 90% with respect to a cross sectional area of a honeycomb cross section orthogonal to an axial direction of the honeycomb structure
   wherein the cells are configured to include at least two types of first cells, and, second cells having a cell shape different from a cell shape of the first cells, the first cells and the second cells are arranged according to a predetermined arrangement standard, and
   a first cells total open frontal area indicating a ratio of a total opening area of all the first cells in a honeycomb cross section with respect to the honeycomb cross section is set to be larger than a second cells total open frontal area indicating a ratio of total opening areas of all the second cells in the honeycomb cross section with respect to the honeycomb cross section, in the first cells, the heat storage portion is formed in all the first cells, and in the second cells, the heat storage portion is formed in all the second cells or at least a portion of the second cells.

2. The porous honeycomb heat storage structure according to claim 1, further comprising:
   a plugging portion which plugs the one end face and the other end face of the cells by a plugging material so as to enclose the heat storage material in the cells, wherein the plugging portion has a porosity of 48% or more.

3. The porous honeycomb heat storage structure according to claim 1, wherein
   the cells are formed by any one of combinations among a combination in which the first cells are pentagonal and the second cells are rectangular, a combination in which the first cells are octagonal and the second cells are rectangular, a combination in which the first cells are hexagonal and the second cells are rectangular, and a combination in which the first cells are hexagonal and the second cells are triangular.

4. The porous honeycomb heat storage structure according to claim 1, wherein the partition wall of the honeycomb structure has a thermal conductivity of 10 W/mK or more.

5. The porous honeycomb heat storage structure according to claim 1, wherein the partition wall of the honeycomb structure has a porosity in a range of 35% to 80%.

6. The porous honeycomb heat storage structure according to claim 1, wherein the heat storage material includes at least any one of an alkaline earth metal oxide and an alkaline earth metal chloride as the main component.

7. The porous honeycomb heat storage structure according to claim 1, wherein the honeycomb structure is configured to include a Si/SiC based ceramic material as the main component.

* * * * *